(12) United States Patent
Amizur et al.

(10) Patent No.: US 9,736,778 B2
(45) Date of Patent: Aug. 15, 2017

(54) METHOD, SYSTEM AND APPARATUS OF TIME OF FLIGHT OPERATION

(71) Applicant: INTEL CORPORATION, Santa Clara, CA (US)

(72) Inventors: Yuval Amizur, Kfar-Saba (IL); Leor Banin, Petach Tikva (IL); Uri Schatzberg, Kiryat Ono (IL)

(73) Assignee: INTEL CORPORATION, Santa Clara, CA (US)

( * ) Notice: Subject to any disclaimer, the term of this patent is extended or adjusted under 35 U.S.C. 154(b) by 178 days.

(21) Appl. No.: 14/517,867

(22) Filed: Oct. 19, 2014

(65) Prior Publication Data

US 2016/0112954 A1    Apr. 21, 2016

(51) Int. Cl.
| | |
|---|---|
| *H04W 52/02* | (2009.01) |
| *H04W 84/12* | (2009.01) |
| *G01S 13/76* | (2006.01) |
| *G01S 5/14* | (2006.01) |
| *G01S 1/20* | (2006.01) |
| *G06F 1/32* | (2006.01) |
| *G06F 9/44* | (2006.01) |

(52) U.S. Cl.
CPC ........ *H04W 52/0235* (2013.01); *H04W 84/12* (2013.01); *Y02B 60/50* (2013.01)

(58) Field of Classification Search
CPC . H04W 84/12; H04W 52/0206; H04W 64/00; H04W 64/003; G01S 13/767; G01S 5/14; G01S 1/20; Y02B 60/50; H04Q 2209/883; G06F 1/32; G06F 9/4418
See application file for complete search history.

(56) References Cited

U.S. PATENT DOCUMENTS

| | | | | |
|---|---|---|---|---|
| 2012/0163261 A1* | 6/2012 | Vedantham | ....... | H04W 52/0206 370/311 |
| 2014/0112224 A1* | 4/2014 | Jafarian | ............ | H04W 52/0209 370/311 |
| 2014/0112229 A1* | 4/2014 | Merlin | .............. | H04W 52/0209 370/311 |
| 2014/0126394 A1* | 5/2014 | Stephens | ........... | H04W 56/0065 370/252 |
| 2014/0211678 A1* | 7/2014 | Jafarian | ............ | H04W 52/0225 370/311 |
| 2015/0094103 A1* | 4/2015 | Wang | .................... | H04W 4/023 455/456.6 |
| 2015/0208349 A1* | 7/2015 | Ramamurthy | .... | H04W 52/0212 370/311 |

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Xavier Szewai Wong
(74) *Attorney, Agent, or Firm* — Shichrur & Co.

(57) ABSTRACT

An apparatus, a system and a method of waking up a station in a wireless local area network (WLAN) to perform time of flight (ToF) measurements. A wake-up signal for waking the station may be configured for a low energy signaling.

25 Claims, 6 Drawing Sheets

(56) References Cited

U.S. PATENT DOCUMENTS

2015/0264530 A1* 9/2015 Prechner ............... H04W 4/025
                                                              455/456.2

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

IEEE Std 802.11ac™-2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

IEEE P802.11ah™/D1.2. Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Sub 1 GHz License Exempt Operation, Feb. 2014, 442 pages.

Banin et al., "Next Generation Indoor Positioning System Based on WiFi Time of Flight", 26th International Technical Meeting of the Satellite Division of The Institute of Navigation, Nashville TN, Sep. 16-20, 2013, 8 pages.

* cited by examiner

METHOD, SYSTEM AND APPARATUS OF TIME OF FLIGHT OPERATION

TECHNICAL FIELD

Some embodiments described herein generally relate to time of flight (ToF) operations in a wireless local area network.

BACKGROUND

Nowadays, small Wireless Local Area Network (WLAN) devices, for example, WiFi devices, which are dedicated to a specific task become very popular. An example for such devices is Time of Flight (ToF) responders. A ToF responder is a device which uses ToF methods to measure a distance between the ToF responder and a requesting device. The ToF responder provides to the requesting device a time of arrival (ToA) measurement and a time of departure (ToD) measurement. Some of the ToF responders are powered by a battery. Thus the power consumption of the ToF responder is critical due to form factor and maintenance.

Furthermore, the ToF responder needs to be always ready for measurements and, accordingly, a receiver of the ToF responder needs to be turned on and ready to receive data packets at all times. In this case, every data packet, which arrives at the ToF responder, should be fully decoded, even the data packet is not addressed to the ToF responder. This may result in very high power consumption, even if the ToF responder does nothing except for listening. As a result, often replacement of the ToF responder battery is needed. Thus, there is a need to decrease the power consumption of the ToF responder.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

Figure 1:
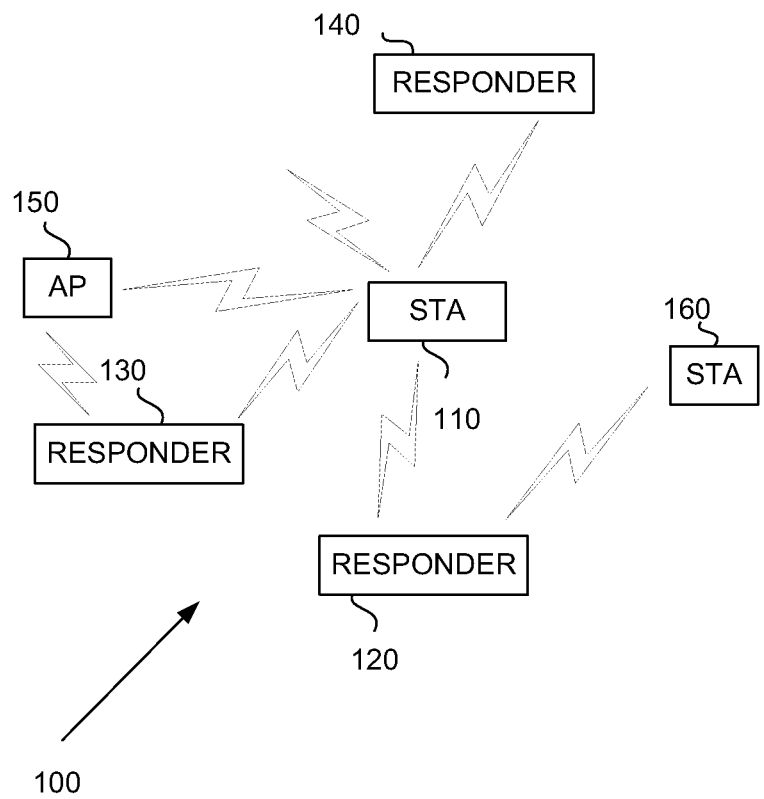
FIG. 1 is a schematic block diagram illustration of a wireless local area network, in accordance with some demonstrative embodiments.

Reference will now be made to the exemplary embodiments illustrated, and specific language will be used herein to describe the same. It will nevertheless be understood that no limitation of the scope of the disclosure is thereby intended.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a Personal Computer (PC), a desktop computer, a mobile computer, a laptop computer, a notebook computer, a tablet computer, an Ultrabook™ computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wearable device, an Internet of Things (IoT) device, a wired or wireless network, a cellular network, a cellular node, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing institute of Electrical and Electronics Engineers (IEEE) 802.11 specifications, e.g., IEEE 802.11-2012, IEEE 802.11aa, IEEE 802.11b, IEEE 802.11ah, IEEE 802.11ac, "IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"; and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (Global Positioning System (GPS), Wireless Fidelity (Wi-Fi), Wi-Max, Zig-Bee™, Ultra-Wideband (UWB), and the like. Other embodiments may be used in various other devices, systems and/or networks.

The phrase "wireless device" and/or "mobile device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the phrase "wireless device" and/or "mobile device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "access point (AP), as used herein, may include an entity that contains a station (STA) and provides access to a distribution service, via a wireless medium (WM) for associated STAs.

The term "station (STA)", as used herein, may include a logical entity that is a singly addressable instance of medium access control (MAC) and physical layer (PHY) interface to the WM.

In some demonstrative embodiments, one or more of the waking-up a device from a power consumption techniques and/or states, e.g., as described below and/or any other techniques and/or methods, may be utilized to perform one or more location and/or positioning operations.

Reference is made to FIG. 1, which schematically illustrates a WLAN 100, in accordance with some demonstrative embodiments. For example WLAN 100 may include a STA 110, a responder 120, a responder 130, a responder 140, an AP and a STA 160.

According to some demonstrative embodiments, responder 120, responder 130, and responder 140 may also be referred herein below as a responding STA, and may include a WLAN STA, if desired. STA 110 may be referred herein below as an initiating STA and STA 160 may be an unassociated STA.

For example, responding STAs 120, 130, 140 may be configured to provide ToF measurements only to initiating STA 110. ToF measurements are also known in an indoor location art as FTM and may include ToA and ToD measurements.

In other embodiments, responders 120, 130 and/or 140 and/or STAs 110 and/or 160 may perform any other additional or alternative functionality.

According to some example embodiments, responding STAs 120, 130 and/or 140 may be in a power consumption mode, and may ignore signals received from STA 160. It should be understood that the power consumption mode may include a sleep mode, a doze mode, a standby mode, a reduced-power mode, or the like.

According to some demonstrative embodiments, while being in the power consumption mode, responding STAs 120, 130 and/or 140 may be configured to receive from initiating STA 110, a wake-up signal, which may be configured for a low energy signaling.

In some demonstrative embodiments, the wake-up signal may include or may be included as part of, for example, a request for one or more ToF measurements. According to one example, responding STA 130 may wakeup and decode a request to provide ToF measurements to initiating STA 110. Responding STA 130 may perform ToF measurements, and may send the ToF measurements to initiating STA 110, if desired. In other embodiments, the wake-up signal may include or may be included as part of, any other signal or message, e.g., a dedicated message or a message separate from the request for ToF measurements, e.g., as described below.

According to another demonstrative embodiment, initiating STA 110 may send a request to AP 150 to send a wake-up signal to responding STA 130. AP 150 may receive the request, and may send the wake-up signal and a FTM request to responding STA 130. Responding STA 130 may wakeup and decode the FTM request, e.g., to provide ToF measurements to initiating STA 110. Responding STA 130 may perform ToF measurements, and may send the ToF measurements to initiating STA 110, if desired.

Figure 2:
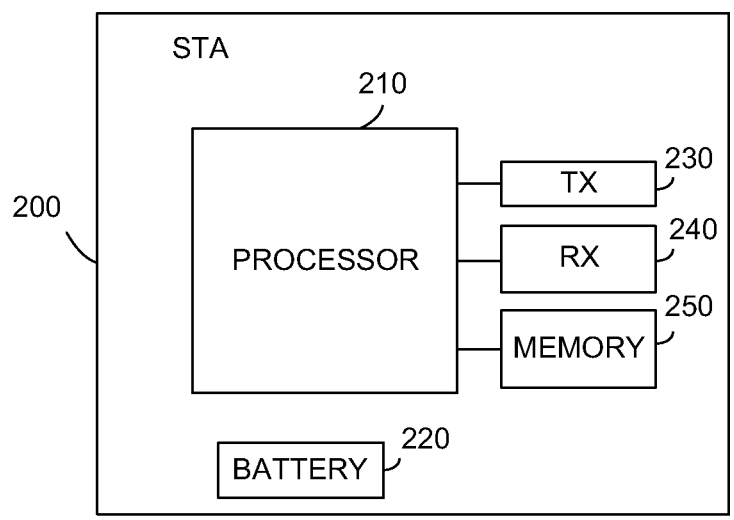
FIG. 2 is a schematic block diagram illustration of a station (STA), in accordance with some demonstrative embodiments.

Reference is made to FIG. 2, which schematically illustrates a station 200, in accordance with some demonstrative embodiments. For example, STA 200 may include a processor 210, a battery 220, a transmitter circuitry and/or logic 230, a receiver circuitry and/or logic 240, and a memory 250. However, it should be understood that this example is not limited, and other additional or alternative modules and/or hardware circuitry and/or logic such as antennas, a baseband, a modem and etc. may be included in STA 200, if desired.

For example, processor 210 may include circuitry and/or logic of a single core processor, a dual core processor a triple core processor a quadrature core processor or the like. In addition, processor 210 may include circuitry and/or a logic of an application processor, a baseband processor, a MAC processor or the like. STA 220 may include circuitry and/or logic, which may operate according to the IEEE 802.11n standard, the IEEE 802.11-2012 standard, the IEEE 802.11 ad-2012 standard, the IEEE 802.11 ac-2013 standard, IEEE 802.11ah, IEEE 802.11b, IEEE 802.11mc or the like. Memory 250 may include circuitry and/or logic of a Flash memory, a non-volatile memory, a volatile memory, or the like. Battery 220 may include a lithium-Ion battery, an alkaline battery, an Aluminum-Ion battery, and the like.

According to some demonstrative embodiments, for example, STA 200 may be included in a mobile device, mobile phone, laptop computer, desktop computer, printers, vending machines, routers, APs, responders, wearable devices, navigation devices or the like.

According to some demonstration embodiments, for example, STA 200 may operate as a responding station, e.g., responder STA 120, 130 or 140 (FIG. 1), or any other station, e.g., any other ToF dedicated responder station or any other non-dedicated station.

In some demonstrative embodiments, receiver circuitry 240 may be configured, for example, to ignore unaddressed signals received from other stations in the WLAN, e.g., while being in the power consumption mode.

In some demonstrative embodiments, receiver circuitry 240 may receive a wakeup signal from an initiating station. For example, the wake-up signal may be configured for a low energy signaling, and may include a request for ToF measurements. Processor circuitry 210 may be configured to decode the wake-up signal. Transmitter circuitry 230 may be configured to transmit one or more ToF measurements to the initiating STA, e.g., as a response to the request.

In on the embodiments, the wake-up signal may include a dedicated signal, or the wakeup signal may be included as part of any other message.

According to some demonstrative embodiments, for example, the wakeup signal may be configured to wakeup stations e.g., a responding station. For example the wakeup signal may be included in messages, as part of IEEE 802.11 data packets and/or as a part of FTM procedure, if desired.

According to some demonstrative embodiments, the wake-up signal may be embedded in a FTM message of an FTM procedure. The FTM procedure may include ToF measurements, and may be configured to allow a responding station to obtain a range to the initiating station.

According to other demonstrative embodiments, the wake-up signal may include for example, an IEEE 802.11b data packet, an IEEE 802.11ah data packet, and/or any other packet, e.g., a dedicated packet or an element or field of a packet.

In some further demonstrative embodiments, the wake up signal may be configured to operate in a narrow bandwidth and a low power. For example, the wake up signal may include, or may be included as part of, a low power data packet with a dedicated preamble for a service or device and/or may include an IEEE 802.11—2012 data packet with a dedicated preamble for a service or device.

In some demonstrative embodiments, the wake-up signal may include, or may be included as part of, an IEEE 802.11b data packet. For example, STA 200 may decode only the IEEE 802.11b data packets, e.g., when operating at the power consumption mode. These packets may be configured to consume less power to decode and designed to operate with lower bandwidth and lower sensitivity. For example, low bandwidth data packet may be designed to operate in a 10 MHz bandwidth and at sample rate of 20 MHz. This type of data packet may not include data. The IEEE 802.11b data packet may be included in the FTM protocol as a wake-up data packet.

In other demonstrative embodiments, the wake-up signal may include, or may be included as part of, a standard IEEE 802.11 data packet with a dedicated preamble, which may be optimized for a low power operation. This wake-up signal may be a part of the FTM protocol. STA 200 may decode only the preamble and not the all packet. For example, STA 200 may decode a data packet with a specific preamble. The preamble may be different for each service and/or device. For example, a certain preamble for positioning and another preamble for printers. A dedicated preamble may be defined in IEEE 802.11, e.g., as described below.

In some demonstrative embodiments, a Preamble field may include two separate subfields, for example, a Preamble Synchronization (SYNC) field, and a start frame delimiter (SFD), e.g., to allow Physical Layer (PHY) circuitry to reach steady-state demodulation and synchronization of bit clock and frame start.

In some demonstrative embodiments, the Preamble SYNC field may include, for example, an 80-bit field containing an alternating "01" pattern, transmitted starting with "0" and ending with "1", to be used by the PHY to detect a potentially receivable signal, select an antenna if diversity is utilized, and reach steady-state frequency offset correction and synchronization with the received packet timing.

In some demonstrative embodiments, the SFD may include, for example, of the 16-bit binary pattern e.g., 0000 1100 1011 1101 (transmitted leftmost bit first). The first bit of the SFD follows the last bit of the sync pattern. The SFD defines the frame timing.

In other embodiments, the wake-up signal may include a dedicated IEEE 802.11 packet with a dedicated preamble. For example, the dedicated IEEE 802.11 signal may be configured to operate in narrow band and may optimize for operation in a low power. This signal may also be configured, for example, to distinguish between different services and/or devices, and/or may apply different preambles for different services, if desired.

Figure 3:
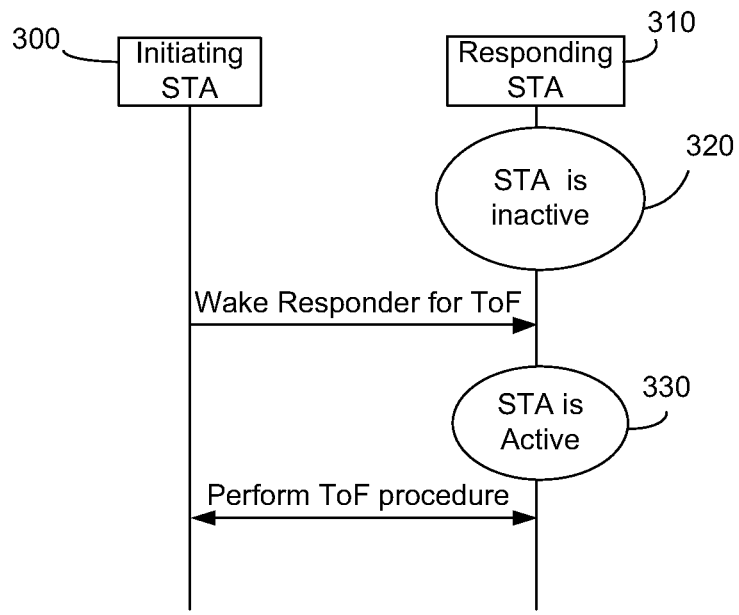
FIG. 3 is a schematic flow diagram illustration of a wake-up sequence flowed by Time of Flight (ToF) measurements, in accordance with some demonstrative embodiments.

Reference is made to FIG. 3, which schematically illustrates of a wake-up sequence flowed by ToF measurements, in accordance with some demonstrative embodiments. For example, while a responding STA 310 is in a power consumption mode, e.g., responding STA 310 is inactive (ellipse 320), and ignoring unaddressed signals received from other stations in the WLAN. An initiating STA 300 may send a wake-up signal to wake responding STA 310, e.g., in order to perform ToF measurements. Responding station 310 may wakeup, may become active (ellipse 330), and may perform the FTM procedure, e.g., including ToF measurements, if desired.

Figure 4:
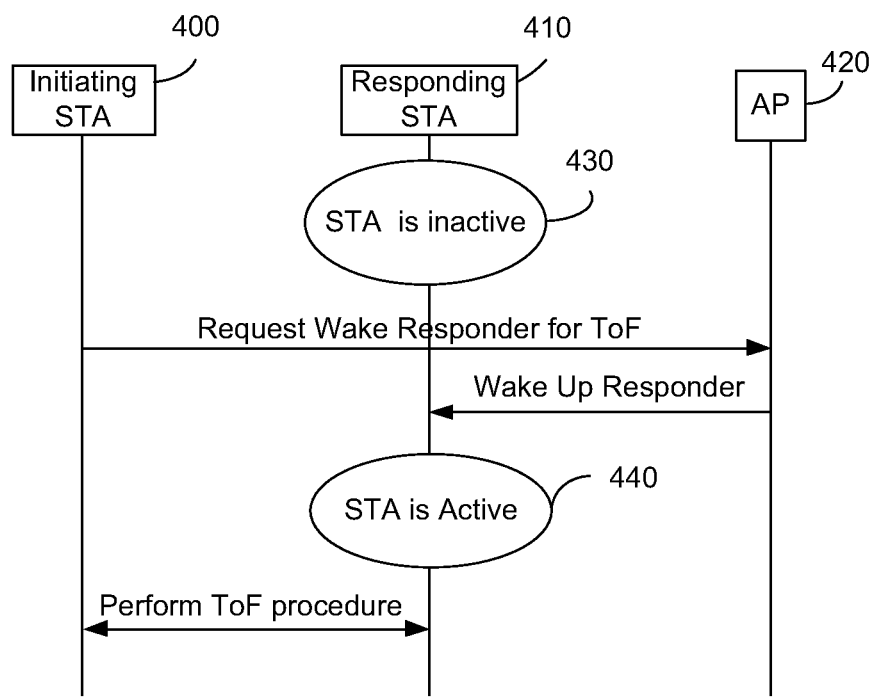
FIG. 4 is a schematic flow diagram illustration of a wake-up sequence flowed by ToF measurements, in accordance with some demonstrative embodiments.

Reference is made to FIG. 4, which schematically illustrates a wake-up sequence flowed by ToF measurements, in accordance with some demonstrative embodiments. In some demonstrative embodiments, for example, while a responding STA 410 is in a power consumption mode, e.g., responding STA 410 is inactive (ellipse 430) and ignoring unaddressed signals receive from other stations in the WLAN. An initiating STA 400 may send to AP 420, a request to wake responding STA 410 to perform ToF measurements. AP 420 may send a wake up signal to responding STA 410. Responding station 410 may wake, become active (ellipse 440) and may performs the FTM procedure e.g., ToF measurements, if desired.

Figure 5:
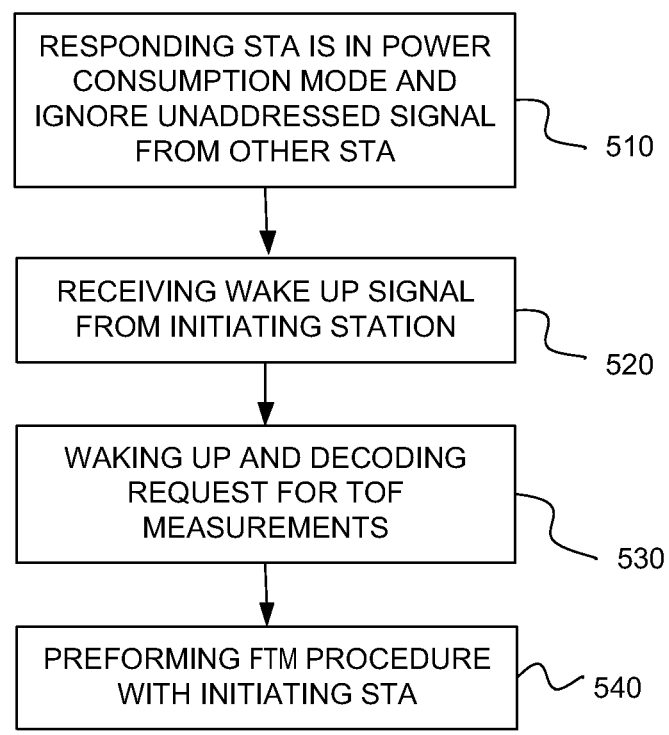
FIG. 5 is a schematic flow-chart illustration of a method of waking-up a station to perform ToF measurements, in accordance with some demonstrative embodiments.

Reference is made to FIG. 5, which schematically illustrates a method of waking-up a station for performing ToF measurements, in accordance with some demonstrative embodiments. According to one example, while being in the power consumption mode a responding STA may ignore unaddressed signals received from other stations in the WLAN (text box 510). While being in the power consumption mode, the responding STA may receive from an initiating STA a wake-up signal. The wake up signal may be configured for a low energy signaling (text box 520).

According to some demonstrative embodiments, the responding STA may become active and may decode a request for ToF measurements (text box 530). The responding STA may perform the FTM procedure with the initiating station (text box 540). The FTM procedure may include ToF measurements.

Figure 6:
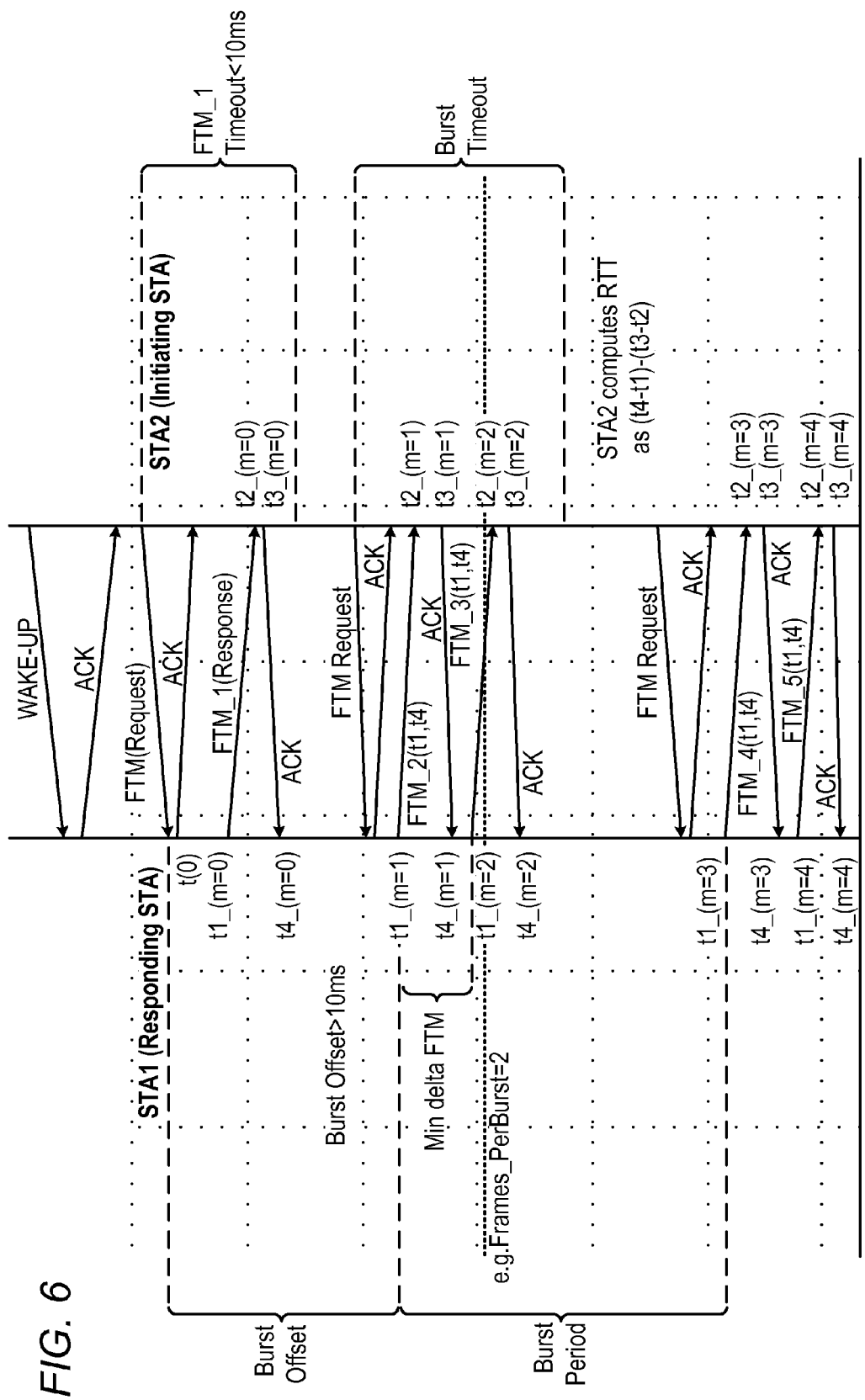
FIG. 6 is a schematic flow diagram illustration of a ToF procedure, in accordance with some demonstrative embodiments.

Reference is made to FIG. 6, which schematically illustrates messages of the FTM procedure, in accordance with some demonstrative embodiments. The FTM procedure may be configured to allow a STA to obtain its range to another STA. A STA may perform procedure with multiple STAs in order to obtain its location.

According to some demonstrative embodiments, an initiating STA (STA 2) may send a wake-up signal to a responding STA (STA 1). STA 1 may wake and send acknowledge (ACK) signal to STA 2. It should be understood that in some other embodiments the wake-up signal may be a part of an FTM request, or any other FTM message.

STA2 may initiate a "FTM Request" (e.g., ToF request) to STAT. STA1 may acknowledge by sending ACK. STA1 may send ToF message e.g., FTM_1, and may save the transmit time t1 in its memory, for example memory 250 of FIG. 2. STA2 may receive the message and saves the receive time t2 in memory for example memory 250 of FIG. 2. STA2 may send an ACK message and may save the transmit time t3 in its memory. STA1 may receive the ACK message and may save the receive time t4 in memory 250. STA1 may transmit the ToF measurements t1 and t4 to STA2 in an FTM_2 message. The time t1 may also be referred to as a ToD, and the time t4 may also be referred to as a ToA. STA2 may calculate the ToF time according to the ToF measurements, t1 and t4, if desired.

Figure 7:
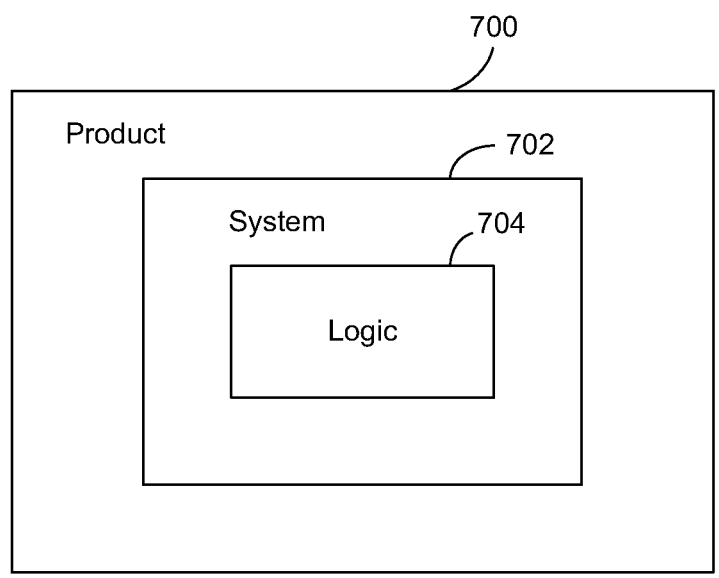
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of one or more elements of WLAN 100 (FIG. 1), one or more elements of STA 200 (FIG. 2), and/or to perform one or more operations of the method of FIGS. 3, 4, and/or 5. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a method of waking up a responding station from a power consumption mode of operation, the method comprising while being in the power consumption mode, ignoring unaddressed signals from one or more wireless local area network (WLAN) stations; receiving a wake-up signal from an initiating station, the wake-up signal being configured for low energy signaling; decoding the wake-up signal; and performing a fine time measurement (FTM) procedure with the initiating station.

Example 2 includes the subject matter of Example 1, and optionally, wherein the wake-up signal is embedded within an FTM message of the FTM procedure, the FTM procedure including time of flight (ToF) measurements corresponding to a range between the initiating station and the responding station.

Example 3 includes the subject matter of Example 1 or 2, and optionally, wherein the responding station comprises an access point (AP).

Example 4 includes the subject matter of any one of Examples 1-3, and optionally, wherein the responding station comprises a responder station dedicated to the FTM procedure.

Example 5 includes the subject matter of any one of Examples 1-4, and optionally, wherein the wake-up signal comprises an IEEE 802.11b data packet.

Example 6 includes the subject matter of any one of Examples 1-4, and optionally, wherein the wake-up signal comprises an IEEE 802.11ah data packet.

Example 7 includes the subject matter of any one of Examples 1-4, and optionally, wherein the wake-up signal is included in a dedicated preamble of a data packet, the dedicated preamble being dedicated for a service or device.

Example 8 includes the subject matter of Example 7, and optionally, wherein the data packet comprises a narrow bandwidth low power data packet.

Example 9 includes a station configured to be woken by a wake up signal, the station comprising receiver circuitry configured to ignore unaddressed signals received from other stations of a wireless local area (WLAN) network while being in a power consumption mode, and to receive from a requesting station the wake-up signal, wherein the wake-up signal is configured for low energy signaling and including a request for a time of flight (ToF) measurements; processor circuitry configured to decode the wake-up signal and the request for ToF measurements; and transmitter circuitry configured to transmit the ToF measurements as a response to the request.

Example 10 includes the subject matter of Example 9, and optionally, wherein the wake-up signal is embedded in a fine time measurement (FTM) procedure, the FTM procedure including ToF measurements corresponding to a range between an initiating station and a responding station.

Example 11 includes the subject matter of Example 9 or Example 10, and optionally, wherein the station is configured to operate as a responder.

Example 12 includes the subject matter of any one of Examples 9-11, and optionally, wherein the wake-up signal comprises an IEEE 802.11b data packet.

Example 13 includes the subject matter of any one of Examples 9-11, and optionally, wherein the wake-up signal comprises an IEEE 802.11ah data packet.

Example 14 includes the subject matter of any one of Examples 9-11, and optionally, wherein the wake-up signal is configured with a narrow bandwidth low power data packet with a dedicated preamble for a service or device.

Example 15 includes the subject matter of any one of Examples 9-11, and optionally, wherein the wake-up signal is configured with a data packet with a dedicated preamble for a service or device.

Example 16 includes a wireless local area network (WLAN) comprising a responding station configured to be woken by a wake up signal, wherein the responding station comprises receiver circuitry configured to ignore unaddressed signals received from one or more wireless local area network (WLAN) stations while being in a power consumption mode, to receive from an initiating station the wake-up signal, the wake-up signal being configured for a low energy signaling and including a request for time of flight (ToF) measurements; processor circuitry configured to decode the wake-up signal and the request; and transmitter circuitry configured to respond to the request with the ToF measurements.

Example 17 includes the subject matter of Example 16, and optionally, wherein the wake-up signal is embedded in a fine time measurement (FTM) procedure, wherein the FTM procedure includes ToF measurements corresponding to a range between the initiating station and the responding station.

Example 18 includes the subject matter of Example 16 or Example 17, and optionally, wherein the responding station comprises an access point (AP).

Example 19 includes the subject matter of any one of Examples 16-18, and optionally, wherein the responding station is configured to operate as a responder.

Example 20 includes the subject matter of any one of Examples 16-19, and optionally, wherein the wake-up signal comprises an IEEE 802.11b data packet.

Example 21 includes the subject matter of any one of Examples 16-19, and optionally, wherein the wake-up signal comprises an IEEE 802.11ah data packet.

Example 22 includes the subject matter of any one of Examples 16-19, and optionally, wherein the wake-up signal is included in a dedicated preamble of a data packet, the dedicated preamble being dedicated for a service or device.

Example 23 includes the subject matter of Example 22, and optionally, wherein data packet comprises a narrow bandwidth low power data packet.

Example 24 includes a wireless communication station configured to request location parameters, the station comprising transmitter circuitry configured transmit a wake-up signal to a time of flight (ToF) measurements station, the wake-up signal being configured for low energy signaling and including a request for ToF measurements; and receiver circuitry configured to receive a ToF message from the ToF measurements station, subsequent to transmission of the wake-up signal, the ToF message including a time of arrival and a time of departure.

Example 25 includes the subject matter of Example 24, and optionally, wherein the wake-up signal is embedded in a message of a fine time measurement (FTM) procedure, the FTM procedure including ToF measurements corresponding to a range between an initiating station and a responding station.

Example 26 includes the subject matter of Example 24 or Example 25, and optionally, wherein the wake-up signal comprises an IEEE 802.11b data packet.

Example 27 includes the subject matter of Example 24 or Example 25, and optionally, wherein the wake-up signal comprises an IEEE 802.11ah data packet.

Example 28 includes the subject matter of Example 24 or Example 25, and optionally, wherein the wake-up signal is included in a dedicated preamble of a data packet, the dedicated preamble including a dedicated preamble for a service or device.

Example 29 includes the subject matter of Example 28, and optionally, wherein the data packet comprises a narrow bandwidth low power data packet.

Example 30 includes a station configured to be woken up by a wake up signal, the station comprising receiver circuitry configured to ignore unaddressed signals received from other wireless local area network (WLAN) stations while being in a power consumption mode, to receive the wake-up signal from an initiating station, the wake-up signal being configured for low energy signaling and including a request for time of flight (ToF) measurements; processor circuitry configured to decode the wake-up signal and the request for ToF measurements; transmitter circuitry configured to respond with the ToF measurements; and a Lithium-ion battery to provide power to the station.

Example 31 includes the subject matter of Example 30, and optionally, wherein the wake-up signal is embedded in a fine time measurement (FTM) procedure, the FTM procedure including ToF measurements corresponding to a range between the initiating station and the station.

Example 32 includes the subject matter of Example 31, and optionally, wherein the station is configured to operate as a responder station dedicated to the FTM procedure.

Example 33 includes the subject matter of any one of Examples 30-32, and optionally, wherein the wake-up signal comprises an IEEE 802.11b data packet.

Example 34 includes the subject matter of any one of Examples 30-32, and optionally, wherein the wake-up signal comprises an IEEE 802.11ah data packet.

Example 35 includes the subject matter of any one of Examples 30-32, and optionally, wherein the wake-up signal is included in a dedicated preamble of a data packet, the dedicated preamble including a dedicated preamble for a service or device.

Example 36 includes the subject matter of Example 35, and optionally, wherein the data packet comprises a narrow bandwidth low power data packet.

Example 37 includes a wireless local area (WLAN) network comprising a station, the station including receiver circuitry configured to ignore unaddressed signals received from other wireless local area (WLAN) stations while being in a power consumption mode, to receive a wake-up signal from an initiating station, the wake-up signal being configured for low energy signaling and including a request for time of flight (ToF) measurements; processor circuitry configured to decode the wake-up signal and the request for ToF measurements; and transmitter circuitry configured to respond with the ToF measurements.

Example 38 includes the subject matter of Example 37, and optionally, wherein the wake-up signal is embedded in a fine time measurement (FTM) procedure, the FTM procedure including ToF measurements corresponding to a range between the initiating station and the station.

Example 39 includes the subject matter of Example 38, and optionally, wherein the station is configured to operate as a responder station dedicated to the FTM procedure.

Example 40 includes the subject matter of any one of Examples 37-39, and optionally, wherein the wake-up signal comprises an IEEE 802.11b data packet.

Example 41 includes the subject matter of any one of Examples 37-39, and optionally, wherein the wake-up signal comprises an IEEE 802.11ah data packet.

Example 42 includes the subject matter of any one of Examples 37-39, and optionally, wherein the wake-up signal is included in a dedicated preamble of a data packet, the dedicated preamble including a dedicated preamble for a service or device.

Example 43 includes the subject matter of Example 42, and optionally, wherein the data packet comprises a narrow bandwidth low power data packet.

Example 44 includes a computer program product comprising one or more tangible computer readable non-transitory storage media comprising computer-executable instructions operable to, when executed by at least one computer processor, enable the at least one computer processor to implement a method of waking up a responding station from a power consumption mode of operation, the method comprising while being in the power consumption mode, ignoring unaddressed signals from one or more wireless local area network (WLAN) stations; receiving a wake-up signal from an initiating station, the wake-up signal being configured for low energy signaling; decoding the wake-up signal; and performing a fine time measurement (FTM) procedure with the initiating station.

Example 45 includes the subject matter of Example 44, and optionally, wherein the wake-up signal is embedded within an FTM message of the FTM procedure, the FTM procedure including time of flight (ToF) measurements corresponding to a range between the initiating station and the responding station.

Example 46 includes the subject matter of Example 44 or Example 45, and optionally, wherein the responding station comprises an access point (AP).

Example 47 includes the subject matter of any one of Examples 44-46, and optionally, wherein the responding station comprises a responder station dedicated to the FTM procedure.

Example 48 includes the subject matter of any one of Examples 44-47, and optionally, wherein the wake-up signal comprises an IEEE 802.11b data packet.

Example 49 includes the subject matter of any one of Examples 44-47, and optionally, wherein the wake-up signal comprises an IEEE 802.11ah data packet.

Example 50 includes the subject matter of any one of Examples 44-47, and optionally, wherein the wake-up signal is included in a dedicated preamble of a data packet, the dedicated preamble being dedicated for a service or device.

Example 51 includes the subject matter of Example 50, and optionally, wherein the data packet comprises a narrow bandwidth low power data packet.

Example 52 includes a station configured to be woken by a wake up signal, the station comprising receiver means configured to ignore unaddressed signals received from other stations of a wireless local area (WLAN) network while being in a power consumption mode, and to receive from a requesting station the wake-up signal, wherein the wake-up signal is configured for low energy signaling and including a request for time of flight (ToF) measurements; processor means configured to decode the wake-up signal and the request for ToF measurements; and transmitter means configured to transmit the ToF measurements as a response to the request.

Example 53 includes the subject matter of Example 52, and optionally, wherein the wake-up signal is embedded in a fine time measurement (FTM) procedure, the FTM procedure including ToF measurements corresponding to a range between an initiating station and a responding station.

Example 54 includes the subject matter of Example 52 or Example 53, and optionally, wherein the station is configured to operate as a responder.

Example 55 includes the subject matter of any one of Examples 52-54, and optionally, wherein the wake-up signal comprises an IEEE 802.11b data packet.

Example 56 includes the subject matter of any one of Examples 52-54, and optionally, wherein the wake-up signal comprises an IEEE 802.11ah data packet.

Example 57 includes the subject matter of any one of Examples 52-54, and optionally, wherein the wake-up signal is configured with a narrow bandwidth low power data packet with a dedicated preamble for a service or device.

Example 58 includes the subject matter of any one of Examples 52-54, and optionally, wherein the wake-up signal is configured with a data packet with a dedicated preamble for a service or device.

Example 59 includes a wireless local area network (WLAN) comprising a responding station configured to be woken by a wake up signal, wherein the responding station comprises receiver means configured to ignore unaddressed signals received from one or more wireless local area network (WLAN) stations while being in a power consumption mode, to receive from an initiating station the wake-up signal, the wake-up signal being configured for a low energy signaling and including a request for time of flight (ToF) measurements; processor means configured to decode the wake-up signal and the request; and transmitter means configured to respond to the request with the ToF measurements.

Example 60 includes the subject matter of Example 59, and optionally, wherein the wake-up signal is embedded in a fine time measurement (FTM) procedure, wherein the FTM procedure includes ToF measurements corresponding to a range between the initiating station and the responding station.

Example 61 includes the subject matter of Example 59 or Example 60, and optionally, wherein the responding station comprises an access point (AP).

Example 62 includes the subject matter of any one of Examples 59-61, and optionally, wherein the responding station is configured to operate as a responder.

Example 63 includes the subject matter of any one of Examples 59-61, and optionally, wherein the wake-up signal comprises an IEEE 802.11b data packet.

Example 64 includes the subject matter of any one of Examples 59-61, and optionally, wherein the wake-up signal comprises an IEEE 802.11ah data packet.

Example 65 includes the subject matter of any one of Examples 59-61, and optionally, wherein the wake-up signal is included in a dedicated preamble of a data packet, the dedicated preamble being dedicated for a service or device.

Example 66 includes the subject matter of Example 65, and optionally, wherein data packet comprises a narrow bandwidth low power data packet.

Example 67 includes a wireless communication station configured to request location parameters, the station comprising transmitter means configured to transmit a wake-up signal to a time of flight (ToF) measurements station, the wake-up signal being configured for low energy signaling and including a request for ToF measurements; and receiver means configured to receive a ToF message from the ToF measurements station, subsequent to transmission of the wake-up signal, the ToF message including a time of arrival and a time of departure.

Example 68 includes the subject matter of Example 67, and optionally, wherein the wake-up signal is embedded in a message of a fine time measurement (FTM) procedure, the FTM procedure including ToF measurements corresponding to a range between an initiating station and a responding station.

Example 69 includes the subject matter of Example 67 or Example 68, and optionally, wherein the wake-up signal comprises an IEEE 802.11b data packet.

Example 70 includes the subject matter of Example 67 or Example 68, and optionally, wherein the wake-up signal comprises an IEEE 802.11ah data packet.

Example 71 includes the subject matter of Example 67 or Example 68, and optionally, wherein the wake-up signal is included in a dedicated preamble of a data packet, the dedicated preamble including a dedicated preamble for a service or device.

Example 72 includes the subject matter of Example 71, and optionally, wherein the data packet comprises a narrow bandwidth low power data packet.

Example 73 includes a station configured to be woken up by a wake up signal, the station comprising receiver means configured to ignore unaddressed signals received from other wireless local area network (WLAN) stations while being in a power consumption mode, to receive the wake-up signal from an initiating station, the wake-up signal being configured for low energy signaling and including a request for time of flight (ToF) measurements; processor means configured to decode the wake-up signal and the request for ToF measurements; transmitter means configured to respond with the ToF measurements; and a Lithium-ion battery to provide power to the station.

Example 74 includes the subject matter of Example 73, and optionally, wherein the wake-up signal is embedded in a fine time measurement (FTM) procedure, the FTM procedure including ToF measurements corresponding to a range between the initiating station and the station.

Example 75 includes the subject matter of Example 73 or Example 74, and optionally, wherein the station is configured to operate as a responder station dedicated to the FTM procedure.

Example 76 includes the subject matter of any one of Examples 73-75, and optionally, wherein the wake-up signal comprises an IEEE 802.11b data packet.

Example 77 includes the subject matter of any one of Examples 73-75, and optionally, wherein the wake-up signal comprises an IEEE 802.11ah data packet.

Example 78 includes the subject matter of any one of Examples 73-75, and optionally, wherein the wake-up signal is included in a dedicated preamble of a data packet, the dedicated preamble including a dedicated preamble for a service or device.

Example 79 includes the subject matter of Example 78, and optionally, wherein the data packet comprises a narrow bandwidth low power data packet.

Example 80 includes a wireless local area (WLAN) network comprising a station, the station including receiver means configured to ignore unaddressed signals received from other wireless local area network (WLAN) stations while being in a power consumption mode, to receive a wake-up signal from an initiating station, the wake-up signal being configured for low energy signaling and including a request for time of flight (ToF) measurements; processor means configured to decode the wake-up signal and the request for ToF measurements; and transmitter means configured to respond with the ToF measurements.

Example 81 includes the subject matter of Example 80, and optionally, wherein the wake-up signal is embedded in a fine time measurement (FTM) procedure, the FTM procedure including ToF measurements corresponding to a range between the initiating station and the station.

Example 82 includes the subject matter of Example 80 or Example 81, and optionally, wherein the station is configured to operate as a responder station dedicated to the FTM procedure.

Example 83 includes the subject matter of any one of Examples 80-82, and optionally, wherein the wake-up signal comprises an IEEE 802.11b data packet.

Example 84 includes the subject matter of any one of Examples 80-82, and optionally, wherein the wake-up signal comprises an IEEE 802.11ah data packet.

Example 85 includes the subject matter of any one of Examples 80-82, and optionally, wherein the wake-up signal is included in a dedicated preamble of a data packet, the dedicated preamble including a dedicated preamble for a service or device.

Example 86 includes the subject matter of Example 85, and optionally, wherein the data packet comprises a narrow bandwidth low power data packet.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example may be referred to herein along with alternatives for the various components thereof. It is understood that such embodiments, examples, and alternatives are not to be construed as defacto equivalents of one another, but are to be considered as separate and autonomous representations.

Furthermore, the described features, structures, or characteristics may be combined in any suitable manner in one or more embodiments.

In the foregoing description, numerous specific details are provided, such as examples of layouts, distances, network examples, etc., to provide a thorough understanding of some demonstrative embodiments. One skilled in the relevant art will recognize, however, that some embodiments can be practiced without one or more of the specific details, or with other methods, components, layouts, etc. In other instances, well-known structures, materials, or operations are not shown or described in detail to avoid obscuring aspects of the disclosure.

While the forgoing examples are illustrative of the principles of some embodiments in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

What is claimed is:

1. A station configured to be woken by a wake up signal, the station comprising:
   receiver circuitry configured to ignore unaddressed signals received from other stations of a wireless local area (WLAN) network while being in a reduced power consumption mode, and to receive from a requesting station the wake-up signal, wherein the wake-up signal is configured for low energy signaling and including a request for location-based time of flight (ToF) measurements corresponding to a range between an initiating station and a responding station;
   processor circuitry configured to decode the wake-up signal and the request for ToF measurements; and
   transmitter circuitry configured to transmit the ToF measurements as a response to the request.

2. The station of claim 1, wherein the wake-up signal is embedded in a fine time measurement (FTM) procedure, the FTM procedure including the ToF measurements corresponding to the range between the initiating station and the responding station.

3. The station of claim 1, wherein the station is configured to operate as a responder.

4. The station claim 1, wherein the wake-up signal comprises an IEEE 802.11b data packet.

5. The station of claim 1, wherein the wake-up signal comprises an IEEE 802.11ah data packet.

6. The station of claim 1, wherein the wake-up signal is configured with a narrow bandwidth low power data packet with a dedicated preamble for a service or device.

7. The station of claim 1, wherein the wake-up signal is configured with a data packet with a dedicated preamble for a service or device.

8. A wireless communication station configured to request location parameters, the station comprising:
   transmitter circuitry configured to transmit a wake-up signal to a time of flight (ToF) measurements station, the wake-up signal being configured for low energy signaling and including a request for location-based ToF measurements corresponding to a range between an initiating station and a responding station; and
   receiver circuitry configured to receive a ToF message from the ToF measurements station, subsequent to transmission of said wake-up signal, the ToF message including a time of arrival and a time of departure.

9. The station of claim 8, wherein the wake-up signal is embedded in a message of a fine time measurement (FTM) procedure, the FTM procedure including the ToF measurements corresponding to the range between the initiating station and the responding station.

10. The station of claim 8, wherein the wake-up signal comprises an IEEE 802.11b data packet.

11. The station of claim 8, wherein the wake-up signal comprises an IEEE 802.11ah data packet.

12. The station of claim 8, wherein the wake-up signal is included in a dedicated preamble of a data packet, the dedicated preamble including a dedicated preamble for a service or device.

13. The station of claim 12, wherein the data packet comprises a narrow bandwidth low power data packet.

14. A wireless local area (WLAN) network comprising a responding station, the responding station including:
receiver circuitry configured to ignore unaddressed signals received from other wireless local area network (WLAN) stations while being in a reduced power consumption mode, to receive a wake-up signal from an initiating station, the wake-up signal being configured for low energy signaling and including a request for location-based time of flight (ToF) measurements corresponding to a range between the initiating station and the responding station;
processor circuitry configured to decode the wake-up signal and said request for ToF measurements; and
transmitter circuitry configured to respond with the ToF measurements.

15. The WLAN of claim 14, wherein the responding station is configured to operate as a responder station dedicated to a fine time measurement (FTM) procedure and the wake-up signal is embedded in the FTM procedure, the FTM procedure including the ToF measurements corresponding to the range between the initiating station and the responder station.

16. The WLAN of claim 14, wherein the wake-up signal comprises an IEEE 802.11b data packet.

17. The WLAN of claim 14, wherein the wake-up signal comprises an IEEE 802.11ah data packet.

18. The WLAN of claim 14, wherein the wake-up signal is included in a dedicated preamble of a data packet, the dedicated preamble including a dedicated preamble for a service or device.

19. A computer program product comprising one or more tangible computer readable non-transitory storage media comprising computer-executable instructions operable to, when executed by at least one processor, enable the at least one processor to cause a responding station to wake up from a reduced power consumption mode of operation, the instructions, when executed, to cause the responding station to:
while being in the reduced power consumption mode, ignore unaddressed signals from one or more wireless local area network (WLAN) stations;
receive a wake-up signal from an initiating station, the wake-up signal being configured for low energy signaling and including a request for location-based time of flight (ToF) measurements corresponding to a range between the initiating station and the responding station;
decode the wake-up signal; and
perform a fine time measurement (FTM) procedure with the initiating station.

20. The computer program product of claim 19, wherein the wake-up signal is embedded within an FTM message of the FTM procedure, the FTM procedure including the ToF measurements corresponding to the range between the initiating station and the responding station.

21. The computer program product of claim 19, wherein the responding station comprises a responder station dedicated to the FTM procedure.

22. The computer program product of claim 19, wherein the wake-up signal comprises an IEEE 802.11b data packet.

23. The computer program product of claim 19, wherein the wake-up signal comprises an IEEE 802.11ah data packet.

24. The computer program product of claim 19, wherein the wake-up signal is included in a dedicated preamble of a data packet, the dedicated preamble being dedicated for a service or device.

25. The computer program product of claim 24, wherein the data packet comprises a narrow bandwidth low power data packet.

* * * * *